United States Patent [19]
Williams et al.

[11] 3,844,180
[45] Oct. 29, 1974

[54] CONTROL MECHANISM
[75] Inventors: Richard D. Williams, Fairport; Fred G. Michaels, Pittsford, both of N.Y.
[73] Assignee: General Motors Corporation, Detroit, Mich.
[22] Filed: Jan. 23, 1973
[21] Appl. No.: 325,325

[52] U.S. Cl................. 74/473 R, 74/491, 74/504, 180/114
[51] Int. Cl.............................................. G05g 9/00
[58] Field of Search....... 74/473 R, 473 SW, 471 R, 74/491, 504; 180/114

[56] References Cited
UNITED STATES PATENTS
| | | | |
|---|---|---|---|
| 3,541,876 | 11/1970 | Gressard | 74/471 R |
| 3,765,262 | 10/1973 | Mendenhall et al. | 74/473 R |
| 3,780,839 | 12/1973 | Schroeder | 74/473 R X |

Primary Examiner—Samuel Scott
Assistant Examiner—F. D. Shoemaker
Attorney, Agent, or Firm—John P. Moran

[57] ABSTRACT

The control mechanism described herein includes an instrument panel-mounted shift control knob assembly which serves to selectively rotate a pulley and belt arrangement to thereby move a pivotally mounted bell-crank lever connected to the belt and to which a transmission shift control cable is operatively attached. Associated with the control knob assembly and with an adjacent lock mechanism is a series of linkage members which serve to concurrently lock the steering wheel and the parking brake in response to the positioning of an ignition key in the "Lock" position in the lock mechanism only after the control knob is manually placed in the "Park" position and the parking brake is manually applied.

14 Claims, 9 Drawing Figures

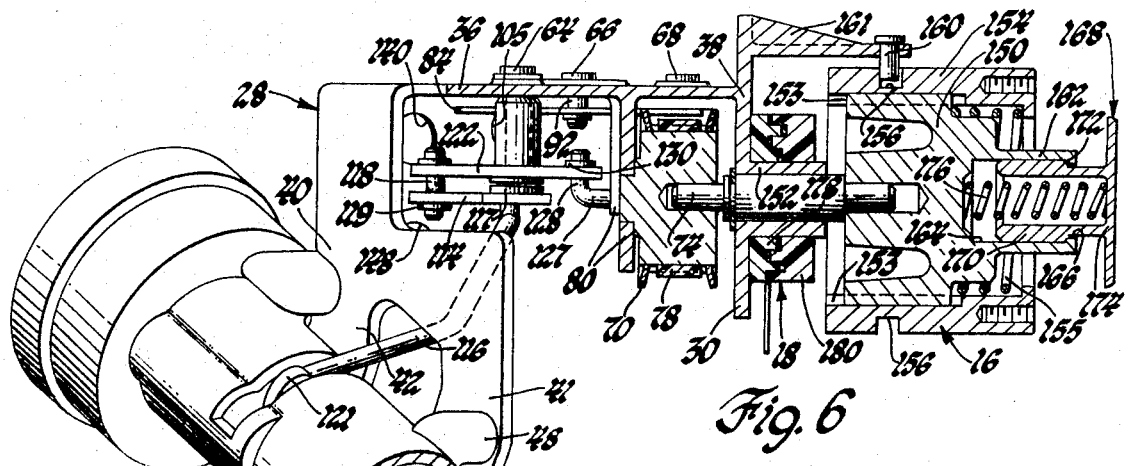
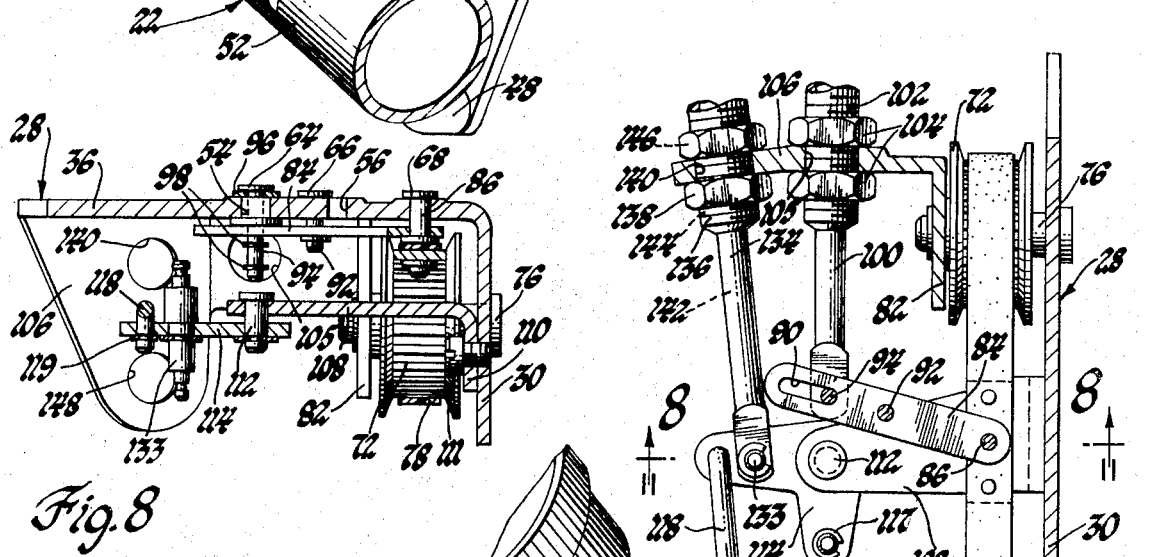
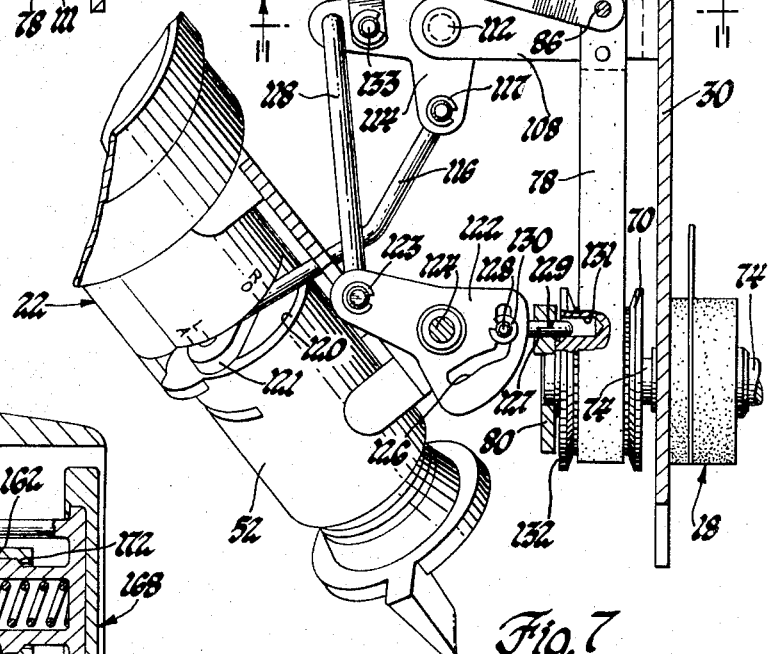
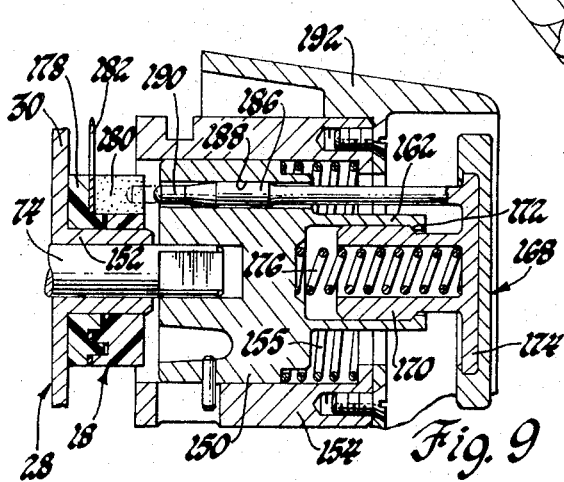

CONTROL MECHANISM

This invention relates generally to automotive control mechanisms and, more particularly, to an instrument panel-mounted cable-actuating type.

An object of the invention is to provide an improved automotive instrument panel-mounted control mechanism suitable for performing a variety of functions.

Another object of the invention is to provide an instrument panel-mounted control mechanism having a rotary control knob assembly for actuating selected transmission drive ratios, and a cooperating lock and linkage mechanism for locking the steering wheel and parking brake and permitting ignition key removal when the control knob is in the "Park" position and the parking brake is manually applied.

A further object of the invention is to provide a control mechanism including a rotary control knob type transmission control arrangement for rotating a flexible belt and pulley and associated bellcrank lever assembly through six selected positions to produce five transmission drive ratios, namely, Reverse (R), Neutral (N), Drive (D), and two Low (S and and L), via an interconnecting cable.

Still another object of the invention is to provide such a rotary control knob and pulley arrangement which is adaptable to having an additional linkage system operatively connected thereto for locking the steering wheel and parking brake automatically upon the manual positioning of an ignition key in the "Lock" position after the control knob has been manually rotated into the "Park" position and the parking brake has been manually applied.

A still further object of the invention is to provide an instrument panel-mounted control mechanism wherein a rotary control knob serves to rotate a toothed pulley and an associated toothed flexible belt, to thereby move a pivotally mounted bellcrank lever which is pivotally secured at one end thereof to the belt and to the other end of which a transmission control cable is pivotally attached, with the further provision of a lock mechanism and a first linkage member extending therefrom to a first pivotally mounted plate member which is both operatively connected to a second pivotally mounted plate via a second linkage member, and directly pivotally connected to cables leading to the steering wheel and the parking brake, there being an additional linkage member pivotally connected to the second plate member and operable to engage the toothed pulley to prevent rotation thereof once the rotary control knob is placed in the "Park" position and in response to rotating the ignition key to the "Lock" position in the lock mechanism.

These and other objects and advantages of the invention will be apparent when reference is made to the following description and accompanying drawings, wherein:

FIG. 6 is a cross-sectional view taken along the plane of line 6—6 of FIG. 3, and looking in the direction of the arrows;

FIG. 7 is a cross-sectional view taken along the plane of line 7—7 of FIG. 3, and looking in the direction of the arrows;

FIG. 8 is a cross-sectional view taken along the plane of line 8—8 of FIG. 7, and looking in the direction of the arrows; and FIG. 9 is an enlarged cross-sectional view taken along the plane of line 9—9 of FIG. 5, and looking in the direction of the arrows.

Figure 1:
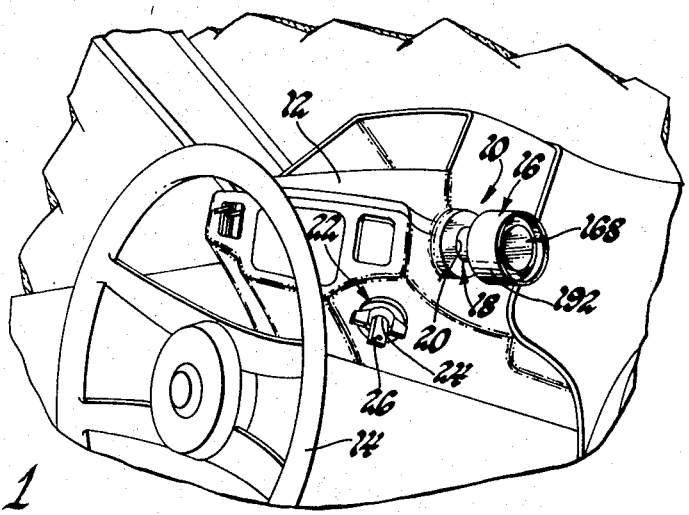
FIG. 1 is a perspective view of a vehicular instrument panel illustrating the inventive control mechanism mounted therein.

Referring now to the drawings in greater detail, FIG. 1 illustrates a control mechanism 10 mounted on an instrument panel 12 of an automotive vehicle, in the vicinity of the steering wheel 14. The control mechanism 10 includes a control knob assembly 16 rotatably mounted adjacent a starter switch 18 extending through an opening 20 formed in the instrument panel 12. A lock mechanism 22, including a key slot 24, is also mounted on the instrument panel 12, adjacent the control knob 16 but at a predetermined angle with respect thereto. A key 26 is insertable into the key slot 24.

Figure 2:
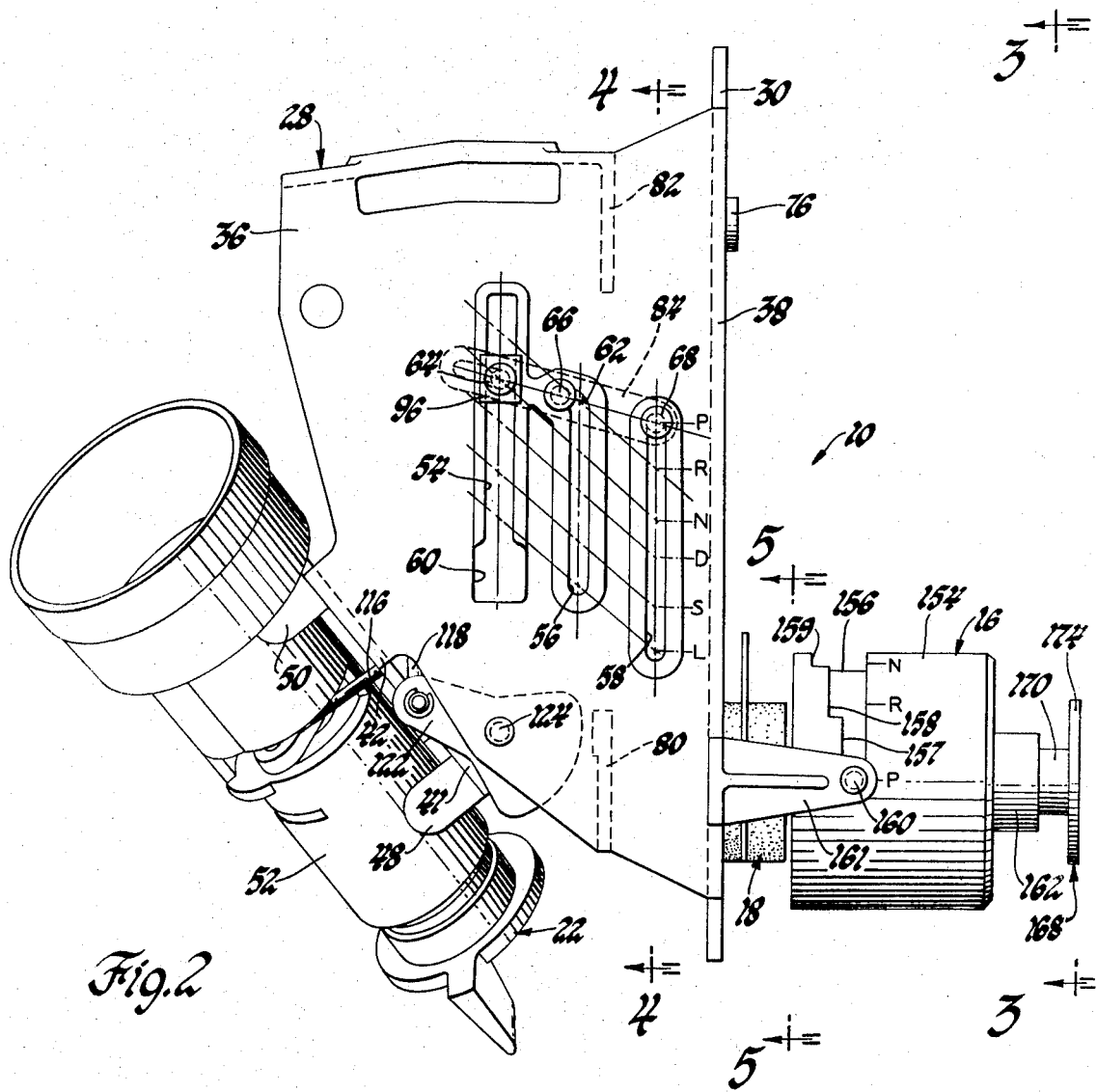
FIG. 2 is a top view of a control mechanism embodying the invention.
Figure 3:
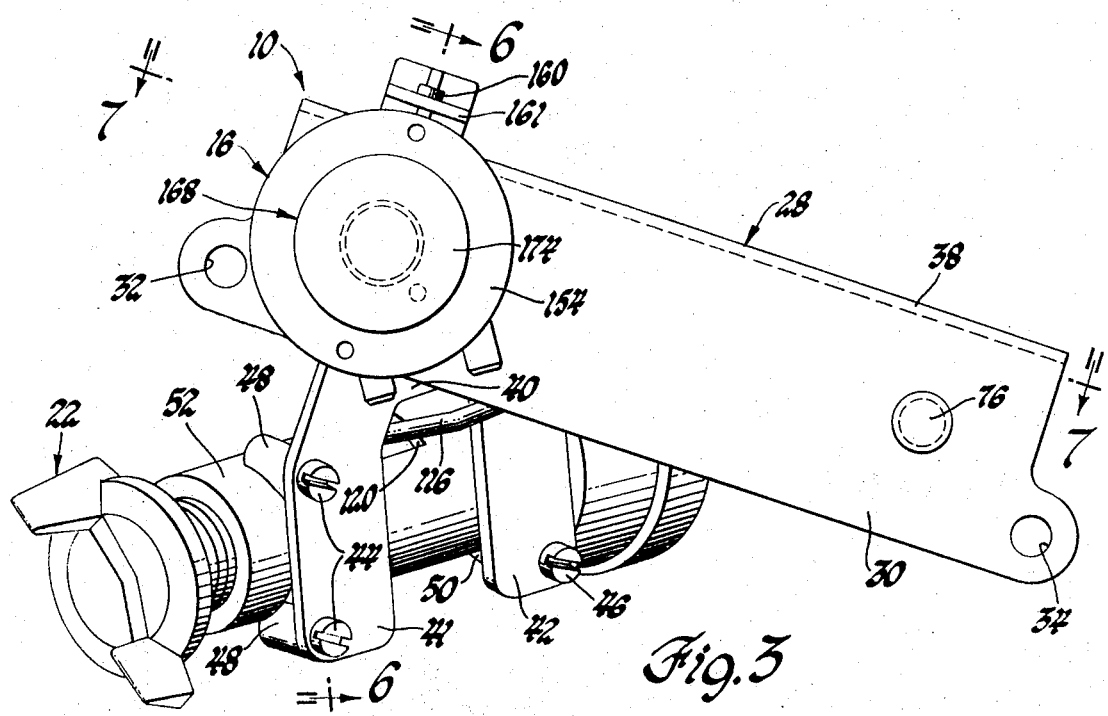
FIG. 3 is an end view taken along the plane of line 3—3 of FIG. 2, and looking in the direction of the arrows.

As may be noted in FIGS. 2 and 3, the control mechanism 10 and the lock mechanism 22 are rigidly secured with respect to one another by an interconnected bracket assembly 28. The assembly 28 includes a first flat plate member 30 (FIG. 3) whose plane is positioned perpendicular to the axis of the control knob 16 and which includes a pair of end openings 32 and 34 providing means for mounting the plate member 30 to the engine side of the instrument panel 12. A second flat plate member 36 (FIG. 2) is formed along an edge 38 of the first plate member 30, extending perpendicularly from the plane of the latter. A third flat plate member 40 including a pair of leg-like extensions 41 and 42 (FIG. 3) is formed along an edge of the plate member 36, perpendicular to the plane thereof, and serves as a base for the mounting thereon of the lock mechanism 22. This is accomplished by extending two pairs of bolts 44 and 46 through openings formed in the respective extensions 41 and 42 and, thence, threadedly attaching the bolts to two pairs of bosses 48 and 50 formed on the outer casing 52 of the lock mechanism 22.

As shown in FIG. 2, three parallel slots 54, 56, and 58 are formed in the plate member 36, the slot 54 having an enlarged opening 60 formed on one end thereof for assembly purposes, and the slot 56 having a short transverse or off-set slot 62 formed adjacent one end thereof opposite the opening 60. Three retainer flanges 64, 66, and 68, each larger in diameter than the width of the respective slots 54, 56, and 58, are slidably mounted on the plate member 36 adjacent such respective slots.

As may be noted from FIGS. 4, 6, 7, and 8, a pair of toothed pulleys 70 and 72 are rotatably mounted on respective shafts 74 and 76 extending through the plate member 30 and operatively interconnected by an endless toothed flexible belt 78. The pulleys 70 and 72 are axially retained adjacent the plate member 30 by respective wall members 80 and 82 formed on the plate member 36 and extending therefrom parallel to the plate member 30.

Figure 4:
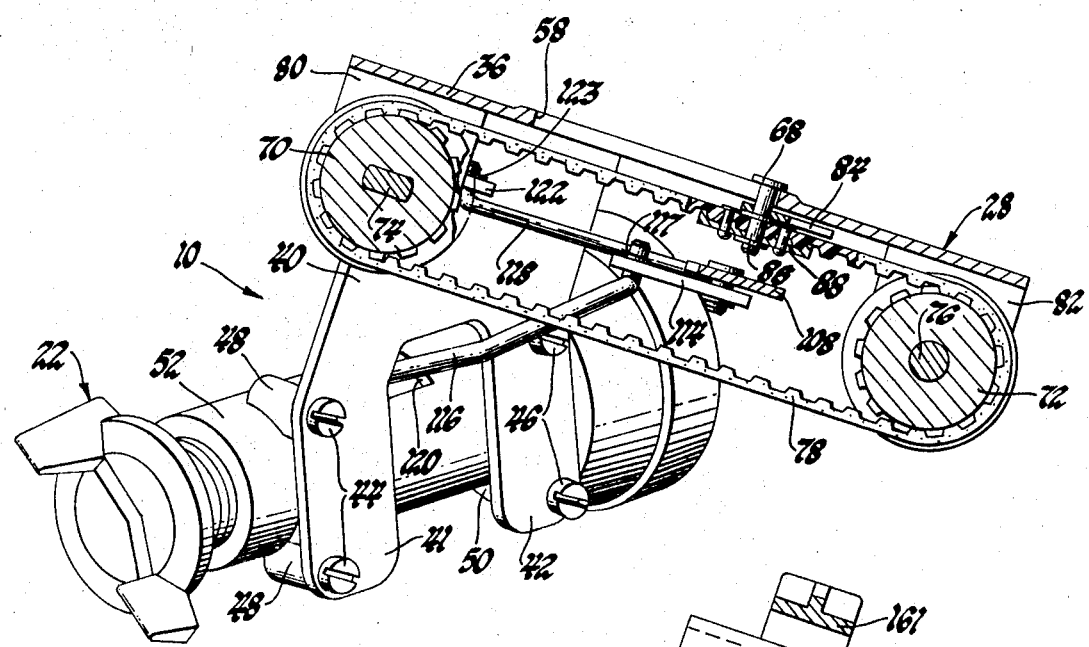
FIG. 4 is a cross-sectional view taken along the plane of line 4—4 of FIG. 2, and looking in the direction of the arrows.

A linkage member or bellcrank lever 84 (FIG. 7) is pivotally connected at one end thereof by a pivot pin member 86 and suitable clamp 88 (FIG. 4) to the outer surface of the belt 78, with lost-motion means in the form of a slot 90 (FIG. 7) formed in the other end of the bellcrank lever 84. The pivot pin member 86 also extends through the slot 58, and it is the retainer flange 68 which retains the pivot pin member 86 for slidable movement in the slot 58. A second pivot pin member 92 (FIG. 7) is formed on and extends from the bellcrank lever 84 at an intermediate point therealong, the retainer flange 66 (FIG. 2) serving to retain the pivot pin member 92 for slidable movement in the interconnected slots 56 and 62 (FIG. 4). Still a third pivot pin member 94 (FIG. 7) extends through the slot 90 formed in the bellcrank lever 84, and, thence, through the slot 54 (FIG. 2) formed in the plate member 36. The pivot pin member 94 is retained for slidable movement in the slot 54 by the retainer flange 64 and a washer member 96, the latter being slidably mountable adjacent the slot 54 through the enlarged end opening 60 of the slot 54.

Adjacent the end of the pivot pin member 94 opposite the retainer flange 64 are formed a pair of spaced collars 98 (FIG. 8), between which is secured the end of a transmission cable 100 (FIG. 7), the latter cable 100 extending from the pivot pin member 94 through a sheave 102 secured by nuts 104 in an opening 105 formed in a wall member 106 formed along an edge of the plate member 36.

A support plate member 108 (FIGS. 7 and 8) extends parallel to the bellcrank lever 84 and includes a flange 110 (FIG. 8) secured to the bracket assembly plate member 30 by a bolt 111. A pivot pin 112 extends between the support plate member 108 and an adjacent parallel plate member 114 for pivotally supporting the latter. A pair of linkage rods 116 and 118 (FIG. 7) are pivotally mounted at predetermined points on the plate member 114 and secured thereon by retainer rings 117 (FIG. 7) and 119 (FIG. 8), respectively. The linkage rod 116 extends through the opening between the extensions 41 and 42 of the plate member 40 and through a slotted opening 120 formed in the outer casing 52 of the lock mechanism 22 to pivotally connect to a member 121 (FIG. 7) mounted therein and rotatably controlled by the key 26. As may be realized from FIG. 7, the member 121 is rotatable by the key 26 into four positions, namely, Lock (L), Accessory (A), Off (O), and Run (R). The key 26 is removable from the lock mechanism 22 only when in the Lock (L) position.

The linkage rod 118 extends to still another plate member 122 and is pivotally secured thereon by a retainer ring 123. The plate member 122 is pivotally mounted on a centrally located pivot pin 124 secured to the plate member 36 (FIG. 2). An arcuate or curved cam slot 126 is formed in the plate member 122 on the side thereof opposite the linkage rod 118 connection, the pivot pin 124 being located in the center thereof. The cam slot 126 is positioned around a pin member 128 for slidable movement thereon. The pin member 128 includes a bent center portion 127 (FIG. 6) and is retained aligned with the pivot pin 124 by virtue of extending through an opening 129 (FIG. 7) formed in the fixed wall member 80. One end of the pin member 128 is thus retained in the slot 126 by a retainer clip 130, while the other end thereof is at times insertable into an opening 131 (FIG. 7) formed in the adjacent face 132 of the pulley 70, as will be explained.

Referring once again to the plate member 114 of FIGS. 6–8, it may be noted that a pin member 133 is mounted thereon and extends from both sides thereof (FIG. 8). A brake cable 134 (FIG. 7) extends from one end of the pin member 133 through a sheave 136 secured by nuts 138 in an opening 140 formed in the wall member 106, while a steering cable 142 (FIG. 7) extends from the other end of the pin member 133 through a second sheave 144 secured by nuts 146 in an opening 148 (FIG. 8) also formed in the wall member 106.

As may be noted in FIG. 6, the control knob 16 includes an inner cylindrical member 150 press-fitted on the shaft 74 on the end thereof opposite the toothed pulley 70, the shaft 74 being supported on the plate member 30 by virtue of extending through a cylindrical hub member 152 formed on the plate member 30. An outer casing 154 is axially slidably mounted on the inner cylindrical member 150 by means of intermeshed splines 153. A spring 155 is mounted between the inner member 150 and the outer casing 154, urging the casing 154 away from the inner member 150. An arcuate opening 156 (FIG. 2) is formed a predetermined distance around the outer casing 154, providing progressively stepped parallel side walls 157, 158, and 159 along one edge thereof. A pin member 160 is mounted on a bracket 161 which is formed on and extends from the interconnecting edge 38 between the plate members 30 and 36, the pin member 160 extending into the arcuate opening 156 and being urged against the adjacent side wall 157, 158, or 159 by the spring 155.

A hub member 162 is formed on the outer end of the cylindrical member 150. A pocket 164 is formed in the hub member 162. An inwardly extending collar 166 is formed adjacent the end of the hub member 162. A starter button assembly 168 includes a sleeve member 170 mounted within the pocket 164 and having a circumferential shoulder 172 formed on the outer periphery thereof. A button 174 is formed on the exposed end of the sleeve member 170, and a spring 176 is mounted in the sleeve member 170 between the inner surface of the starter button 174 and the bottom of the pocket 164, urging the shoulder 172 into contact with the collar 166.

Figure 5:
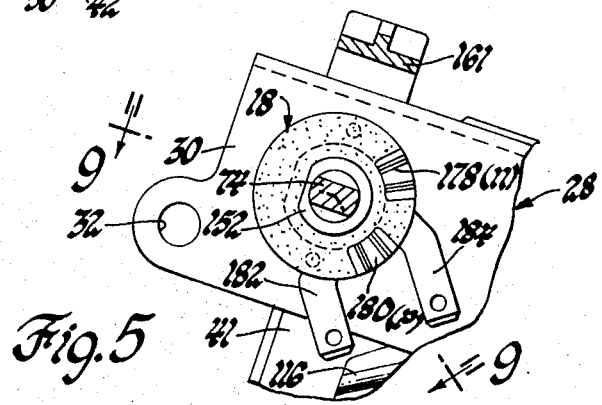
FIG. 5 is a fragmentary cross-sectional view taken along the plane of line 5—5 of FIG. 2, and looking in the direction of the arrows.

As shown in FIG. 6, the starter switch 18 is mounted around the hub member 152 and includes two sets of contacts 178 and 180 (FIG. 5) positioned at predetermined locations thereon. A pair of terminals 182 and 184 extend outwardly from the starter switch 18. Referring now to FIG. 9, it may be noted that a rod-like member 186 is formed on the starter button 174, extending therefrom through a passage 188 formed through the inner cylindrical member 150. It may be further noted that, as the button 174 is depressed against the force of the spring 176, the end 190 of the member 186 may be projected into one of the sets of contacts 178 or 180, provided the latter is properly aligned therewith. The precise circumferential locations of the contacts 178 and 180 are such that the end 190 may enter respectively therein only when the control knob assembly 16 is positioned in the Neutral (N)

or Park (P) position, respectively. Hence, start-up may occur only in the latter conditions.

As may be realized from FIG. 2, the conventional indicia P-R-N-D-S-L are formed on the outer casing 154 of the control knob 16, such indicia corresponding to five transmission drive ratio positions of the transmission cable 100 resulting from the movement of the pivot pin member 86 (FIG. 7) in the slot 58 (FIG. 2) formed in the plate member 36, the six (6) drive ratios being well known as Park (P), Reverse (R), Neutral (N), Drive (D), and two Lows (S and L). If desired, a housing member 192 (FIGS. 1 and 9) may be formed on the outer casing 154 to cover the starter button assembly 168.

In operation, from FIGS. 3, 4, 6, and 7, it is apparent that as the housing member 192 or the control knob outer casing 154 is manually rotated, the inner cylindrical member 150, the shaft 74, the pulley 70, and the flexible belt 78 are correspondingly rotated to thereby cause the bellcrank lever 84, through the pivot pin member 86, to slide the pivot pin 92 along the slot 56, thus sliding the pivot pin member 94 along the slot 54, initiating movement of the cable 100 leading to the transmission shift lever (not shown).

As may be noted from FIG. 2, the slots 56 and 54 formed in the plate member 36 appropriately position the respective pivot pin members 92 and 94, in response to the sliding movement of the pivot pin member 86 in the slot 58, so as to produce the desired transmission drive ratio through the transmission cable 100. By virtue of the off-set or short transverse opening 62 (FIG. 2) formed at the end of the slot 56, it may be noted from FIG. 2 that, as the pivot pin member 92 (FIG. 7) moves therein in response to the pivot pin member 86 being positioned in the Park position in the slot 58, the retainer flange 64 and its associated pivot pin member 94 will seek the same point in the slot 54 for the Park position of the retainer flange 68 and its associated pivot pin member 86 in the slot 58 as would result from positioning the pivot pin member 86 in the Neutral position in the slot 58.

As may now be realized from FIGS. 6 and 7, rotation of the member 121 of the lock mechanism 22 via the key 26 (FIG. 1) produces a corresponding movement of the linkage rod 116 (FIG. 7) which, in turn, pivots the plate member 114 about the pivot pin 112. This correspondingly moves the linkage rod 118, causing the plate member 122 to pivot about the pivot pin 124 and forces the pin member 128 toward or away from the axis of the pivot pin 124, depending upon the positioning of the cam slot 126. It is only when the control knob casing 154 is rotated to Park (P) that the opening 131 is aligned with the adjacent end of the pin member 128. The shape of the cam slot 126 is such that the pin member 128 is caused to enter the opening 131 in its Park (P) location only when the key-controlled member 121 is rotated into the Lock (L) position (FIG. 7). The resultant movement of the linkage rod 116 and the plate member 114, when the lock mechanism member 121 is rotated into the Lock (L) position, is such that the brake and steering cables 134 and 142, respectively, which are pivotally secured to the plate member 114 by the pin member 133 are caused to move to lock the steering wheel 14 and the parking brake (not shown). This, of course, as indicated above, would not occur unless the control knob assembly 16 is first rotated to the Park (P) position.

It should be apparent that the invention provides an improved, compact instrument panel-mounted control mechanism wherein manual rotation of a control knob serves, through an associated pulley and belt arrangement, to efficiently move a cable to selectively shift the transmission. It should also be apparent that the control mechanism further includes a lock mechanism and associated linkage means for actuating two additional cables and a linkage rod to respectively lock the steering wheel and parking brake and to permit key removal automatically, provided the control knob has first been rotated into the Park (P) position, and the parking brake is manually applied.

While but one embodiment of the invention has been shown and described, other modifications thereof are possible.

We claim:

1. A control mechanism comprising a bracket member, first and second pulleys rotatably mounted on said bracket member, a control knob operatively connected to one of said pulleys and manually rotatable into a plurality of predetermined circumferential positions, an endless flexible belt mounted around said first and second pulleys, a bellcrank lever having one end thereof pivotally connected to said flexible belt, first, second, and third slots formed in said bracket member, first, second, and third pivot pin members slidably mounted in said first, second, and third slots, respectively, said first and second pivot pin members being secured to said bellcrank lever, a slot formed in the other end of said bellcrank lever, said third pivot pin member being slidably mounted in said bellcrank lever slot, connecting means connected at one end thereof to said third pivot pin member and at the other end thereof to a device to be controlled, the movement of said second pivot pin member along said second slot in response to manual movement of said control knob serving to control the angular relationship of said bellcrank lever between said flexible belt and said connecting means and thereby moving said third pivot pin member into predetermined positions along said third slot corresponding to said predetermined circumferential positions of said control knob.

2. A control mechanism for a vehicular transmission, said control mechanism comprising a bracket member, first and second pulleys rotatably mounted on said bracket member, a control knob operatively connected to one of said pulleys and manually rotatable into a plurality of predetermined circumferential positions corresponding to Park, Reverse, Neutral, Drive, and Low transmission drive ratios, an endless flexible belt mounted around said first and second pulleys, a bellcrank lever having one end thereof pivotally connected to said flexible belt, first, second, and third slots formed in said bracket member, first, second, and third pivot pin members slidably mounted in said first, second, and third slots, respectively, said first and second pivot pin members being secured to said bellcrank lever, a slot formed in the other end of said bellcrank lever, said third pivot pin member being slidably mounted in said bellcrank lever slot, a cable connected at one end thereof to said third pivot pin member and at the other end thereof to said transmission, the movement of said second pivot pin member along said second slot in response to manual movement of said control knob serving to control the angular relationship of said bellcrank lever between said flexible belt and said cable and thereby moving said third pivot pin member into predetermined positions along said third slot corresponding to said predetermined circumferential positions of said control knob.

3. The control mechanism described in claim 2, and a transverse slot formed in said bracket member adjacent the end of said second slot and serving to cooperate with said second pivot pin member to cause said third pivot pin member to attain the same position in said third slot for both the Park and Neutral positions of said control knob.

4. A control mechanism comprising bracket means, first and second pulleys rotatably mounted on said bracket means, a control knob operatively connected to one of said pulleys and manually rotatable into a plurality of predetermined circumferential positions, an endless flexible belt mounted around said first and second pulleys, a bellcrank lever having one end thereof pivotally connected to said flexible belt, first, second, and third slots formed in said bracket means, an off-set slot formed in said bracket means adjacent the end of said second slot, a first pivot pin member extending from said bellcrank lever into said first slot, a second pivot pin member connected at an intermediate point on said bellcrank lever and extending into said second slot, lost-motion means formed on the other end of said bellcrank lever, a third pivot pin member extending through said lost-motion means and into said third slot, means for connecting an actuator member thereto formed on said third pivot pin member, said first, second, and third pivot pin members cooperatively responding to manual actuation of said control knob to move along said respective first, second, and third slots to thus cause said actuator member to move into a series of positions corresponding to said plurality of predetermined circumferential positions of said control knob so long as said second pivot pin member remains in said second slot, said third pivot pin member being moved back into a predetermined one of said series of positions when said second pivot pin member is moved into said off-set slot in response to the manual movement of said control knob into a particular one of said plurality of predetermined circumferential positions.

5. For use with an automotive transmission, an instrument panel-mounted control mechanism comprising bracket means, first and second pulleys rotatably mounted on said bracket means, a control knob operatively connected to one of said pulleys and manually rotatable into a plurality of predetermined circumferential positions corresponding to Park, Reverse, Neutral, Drive, and Low transmission drive ratios, an endless flexible belt mounted around said first and second pulleys, a bellcrank lever having one end thereof pivotally connected to said flexible belt, first, second, and third slots formed in said bracket means, an off-set slot formed in said bracket means adjacent the end of said second slot, a first pivot pin member extending from said bellcrank lever into said first slot, a second pivot pin member connected at an intermediate point on said bellcrank lever and extending into said second slot, lost-motion means formed in the other end of said bellcrank lever, a third pivot pin member extending through said lost-motion means and into said third slot, a cable connected at one end thereof to said third pivot pin member and at the other end thereof to said transmission, said first, second, and third pin members responding to manual actuation of said control knob to move along said respective first, second, and third slots to thus cause said cable to move into a series of positions corresponding to said Reverse, Neutral, Drive, and Low drive ratio positions of said control knob so long as said second pivot pin member moves along said second slot, said third pivot pin member and said cable being moved back into said Neutral position when said second pivot pin member is moved into said off-set slot in response to the manual movement of said control knob into said Park position.

6. A control mechanism comprising first and second plate members interconnected at a predetermined angle with respect to one another, a shaft rotatably mounted through said first plate member, a control knob secured to one end of said shaft and manually rotatable into a plurality of predetermined circumferential positions, a first pulley secured to the other end of said shaft, a second pulley rotatably mounted on said first plate member, an endless flexible belt mounted around said first and second pulleys, a bellcrank lever having one end thereof pivotally connected by a first pivot pin member to the outer periphery of said flexible belt, first, second, and third straight slots formed in said second plate member, an off-set slot formed in said second plate member adjacent the end of said second straight slot, said first pivot pin member extending into and being slidably mounted in said first straight slot, a second pivot pin member connected at an intermediate point on said bellcrank lever and extending into and being slidably mounted in said second straight slot, a slot formed in the other end of said bellcrank lever, a third pivot pin member being slidably mounted in both said bellcrank lever slot and said third straight slot, a cable connected at one end thereof to said third pivot pin member and at the other end thereof to a device to be controlled, the movement of said second pivot pin member along said second straight slot and said off-set slot in response to manual movement of said control knob serving to control the angular relationship of said bellcrank lever between said flexible belt and said cable to actuate said cable into different linear positions corresponding to said plurality of predetermined circumferential positions of said control knob, with said cable being further caused to assume one predetermined position for two predetermined circumferential positions of said control knob.

7. For use with an automotive transmission, an instrument panel-mounted control mechanism comprising first and second plate members interconnected at a predetermined angle with respect to one another, a shaft rotatably mounted through said first plate member, a control knob secured to one end of said shaft and manually rotatable into a plurality of predetermined circumferential positions corresponding to Park, Reverse, Neutral, Drive, and Low transmission drive ratios, a first pulley secured to the other end of said shaft, a second pulley rotatably mounted on said first plate member, an endless flexible belt mounted around said first and second pulleys, a bellcrank lever having one end thereof pivotally connected by a first pivot pin member to the outer periphery of said flexible belt, first, second, and third parallel slots formed in said second plate member, a transverse slot formed in said second plate member adjacent the end of said second parallel slot, said first pivot pin member extending into and being slidably mounted in said first parallel slot, a second pivot pin member connected at an intermediate point on said bellcrank lever and extending into and being slidably mounted in said second parallel slot, a slot formed in the other end of said bellcrank lever, a third pivot pin member being slidably mounted in both said bellcrank lever slot and said third parallel slot, a cable connected at one end thereof to said third pivot pin member and at the other end thereof to said transmission, the movement of said second pivot pin member along said second parallel slot and said transverse slot in response to manual movement of said control knob serving to control the angular relationship of said bellcrank lever between said flexible belt and said cable to actuate said cable into different linear positions corresponding to said plurality of predetermined circumferential positions of said control knob, with said cable being further caused to assume one predetermined position for both the Park and Neutral circumferential positions of said control knob.

8. The control mechanism described in claim 7, and a lock mechanism having a key operable therewith; a device to be controlled; and a linkage system operatively connected between said lock mechanism, said device to be controlled, and one of said first and second pulleys, for automatically locking said device to be controlled in response to the manual movement of said key into the Lock position in said lock mechanism after the manual movement of said control knob into said Park position.

9. The control mechanism described in claim 8, wherein said linkage system includes a first pivotally mounted plate member, a first linkage member pivotally connected at one end thereof to said first pivotally mounted plate member and at the other end thereof to said lock mechanism, means formed on said first pivotally mounted plate member for pivotally mounting at least one actuator member thereon for connection with said device to be controlled, a second pivotally mounted plate member having a contoured slot formed therein, a second linkage member pivotally connected between said first and second pivotally mounted plate members, an opening formed in a face of one of said first and second pulleys, and a formed linkage member slidably mounted in said contoured slot and positioned adjacent said face of one of said first and second pulleys for selective insertion in said opening by said second pivotally mounted plate member in response to said manual movement of said key into said Lock position in said lock mechanism after said manual movement of said control knob into said Park position for locking said device to be controlled.

10. The control mechanism described in claim 7, and a lock mechanism having a key operable therewith; a plurality of devices to be controlled; and linkage system operatively connected between said lock mechanism, said plurality of devices to be controlled, and one of said first and second pulleys, for automatically locking said plurality of devices to be controlled in response to the manual movement of said key into the Lock position in said lock mechanism after said manual movement of said control knob into said Park position.

11. The control mechanism described in claim 10, wherein said linkage system includes a first pivotally mounted plate member, a first linkage member pivotally connected at one end thereof to said first pivotally mounted plate member and at the other end thereof to said lock mechanism, means formed on said first pivotally mounted plate member for pivotally mounting a plurality of actuator members thereon for respective connection with said plurality of devices to be controlled, a second pivotally mounted plate member having a contoured slot formed therein, a second linkage member pivotally connected between said first and second pivotally mounted plate members, and an opening formed in the face of one of said first and second pulleys, and a formed linkage member slidably mounted in said contoured slot and positioned adjacent said face of one of said first and second pulleys for selective insertion in said opening by said second pivotally mounted plate member in response to said manual movement of said key into the Lock position in said lock mechanism after said manual movement of said control knob into said Park position for locking said plurality of devices to be controlled.

12. For use with an automotive steering wheel and parking brake, the control mechanism described in claim 11, wherein said actuator members consist of a second cable connected between said mounting means and said steering wheel, and a third cable connected between said mounting means and said parking brake, said second and third cables serving to lock said respective steering wheel and parking brake in response to said manual movement of said key into the Lock position in said lock mechanism after said manual movement of said control knob into said Park position and manual application of said parking brake.

13. The control mechanism described in claim 12, wherein said key is removable from said lock mechanism only when moved into said Lock position therein.

14. The control mechanism described in claim 13, and a starter button assembly operatively connected to said control knob.

* * * * *